(12) United States Patent
Cho

(10) Patent No.: US 6,845,673 B2
(45) Date of Patent: Jan. 25, 2005

(54) PRESSURE MEASURING STRUCTURE OF HOT AIR GENERATOR

(75) Inventor: Chi Hyoung Cho, Ansan-Si (KR)

(73) Assignee: Paseco Co., Ltd. (KR)

( * ) Notice: Subject to any disclaimer, the term of this patent is extended or adjusted under 35 U.S.C. 154(b) by 0 days.

(21) Appl. No.: 10/638,978

(22) Filed: Aug. 12, 2003

(65) Prior Publication Data

US 2004/0031324 A1 Feb. 19, 2004

(30) Foreign Application Priority Data

Aug. 13, 2002 (KR) .............................. 10-2002-0047813

(51) Int. Cl.[7] .............................................. G01L 7/00
(52) U.S. Cl. ......................................... 73/714; 73/700
(58) Field of Search .................................. 73/700–756

(56) References Cited

U.S. PATENT DOCUMENTS 5,601,413 A * 2/1997 Langley et al. ............... 417/12
5,932,940 A * 8/1999 Epstein et al. ........... 310/40 MM

* cited by examiner

Primary Examiner—Edward Lefkowitz
Assistant Examiner—Jermaine Jenkins
(74) Attorney, Agent, or Firm—F. Chau & Associates, LLC

(57) ABSTRACT

A pressure measuring structure of a hot air generator is provided. The pressure measuring structure includes a hot air generator body (10) provided with a fuel tank (12) in the lower portion thereof, an air blower duct (20) having a heater therein and provided in the upper portion of the hot air generator body (10), a nozzle assembly (22) provided in the rear portion of the air blower duct (20), a vane pump (28) provided in the rear end of the hot air generator body (10), connected to the nozzle assembly (22) through an air line (26), and generating a predetermined pressure, an air blower fan (32) for blowing air toward the air blower duct (20), and a driving motor (30) driven in interlock with the vane pump (28) and rotating the air blower fan (32), wherein the air line (26) connecting the vane pump (28) with the nozzle assembly (22) is branched off into a first air line (26a) and a second air line (26b) via a T-shaped nozzle (45), and wherein the second air line (26b) is connected to the nozzle assembly (22) and a pressure measuring indicator (40) for measuring a pressure generated from the vane pump (28) is installed along the first air line (26a). Accordingly, through a pressure indicated on the pressure measuring indicator (40), a user can easily recognize whether or not a combustion pressure is appropriate.

5 Claims, 5 Drawing Sheets

PRESSURE MEASURING STRUCTURE OF HOT AIR GENERATOR

TECHNICAL FIELD

The present invention relates to a pressure measuring structure of a hot air generator, and more particularly, to a pressure measuring structure of a hot air generator having a pressure measuring indicator in an outer side of a hot air generator body, in order for a user to immediately recognize a pressure generated during running of the hot air generator.

BACKGROUND ART

In general, a hot air generator is provided with a heater or heat wires made of coils, and thus increases inhaled air at a relatively high temperature when electric power is applied thereto, to then exhaust hot air by using an air blower fan.

Such a hot air generator is used at a place where hot air is needed in a factory or a closed area, or is used to remove humidity at a greenhouse called a vinylhouse using a greenhouse effect or a cattle shed.

However, a conventional hot air generator is not provided with an indicator indicating an appropriate pressure necessary for operation of the hot air generator. Accordingly, in order to measure a current pressure of hot air generated from the vane pump whenever the current pressure need to be measured, a pressure gauge must be mounted onto a vane pump located in a rear end of the hot air generator. As a result, in the case of the conventional hot air generator, users cannot immediately see a pressure generated during running of the hot air generator.

In particular, when abnormality occurs in a driving motor interlocked with the vane pump, users cannot immediately recognize how many pressures have been generated from the vane pump. In order to check a pressure, a pressure gauge must be connected to the vane pump.

Also, a pressure indicator which can allow users to identify an appropriate pressure is not installed in the conventional hot air generator. Thus, it is difficult for users to see at a glance whether or not a running pressure is appropriate. It is also difficult for users to control a pressure generated from a vane pump.

Further, it is difficult for users to grasp what makes an ignition fail as well, and thus it will be long to repair it during performing an after-service.

DISCLOSURE OF THE INVENTION

To solve the above problems, it is an object of the present invention to provide a pressure measuring structure of a hot air generator in which a pressure measuring indicator which can measure a pressure generated from a vane pump at the same time of running is installed in one side of a hot air generator body, to thereby enable a user to immediately recognize a pressure generated during running.

To accomplish the above object of the present invention, there is provided a pressure measuring structure of a hot air generator comprising: a hot air generator body provided with a fuel tank in the lower portion thereof; an air blower duct having a heater therein and provided in the upper portion of the hot air generator body; a nozzle assembly provided in the rear portion of the air blower duct; a vane pump provided in the rear end of the hot air generator body, connected to the nozzle assembly through an air line, and generating a predetermined pressure; an air blower fan for blowing air toward the air blower duct; and a driving motor driven in interlock with the vane pump and rotating the air blower fan, wherein the air line connecting the vane pump with the nozzle assembly is branched off into a first air line and a second air line via a T-shaped nozzle, and wherein the second air line is connected to the nozzle assembly and a pressure measuring indicator for measuring a pressure generated from the vane pump is installed along the first air line.

Here, the pressure measuring indicator comprises: a measuring unit body having a cover fitted into the first air line, and a cylinder mutually connected with the cover to embody a single body; a pressure measuring unit provided in the measuring unit body, and driven on the basis of a pressure inhaled into the measuring unit body via the first air line; and a pressure indicator having a pressure indicator window provided with pressure readings formed on the outer circumferential surface of the cylinder so that a user can recognize a pressure visibly according to operation of the pressure measuring unit.

In this case, the pressure measuring indicator is installed in the outer side of the hot air generator, and thus the user can recognize a pressure indicated on the pressure measuring indicator.

Also, the pressure measuring unit comprises: an air chamber provided in the cylinder with one end thereof combined at a sealing state with one inner side of the cylinder by the cover so that the air chamber is expanded along the lengthy direction of the cylinder based on a pressure input into the cylinder via the first air line; an air chamber guide installed in the front surface of the air chamber, and moving at the time of expansion of the air chamber and also surrounding and supporting one end of the air chamber; a spring member provided in the outer side of the air chamber guide and contracted and elastically restored according to a pressure applied to the air chamber; an indicator combined on the outer side of the air chamber guide, and moving between the air chamber guide and the spring member to indicate a pressure reading on the pressure indicator window to indicate a pressure in the air chamber; and a tension adjustment screw installed in one side end of the cylinder which is opposite to the cover, for adjusting a tension of the spring member.

In particular, the air chamber is preferably formed of a corrugated structure in the form of a bellows, so that the air chamber can be expanded according to a pressure of the air incoming via the cover. The air chamber is made of rubber or silicon.

BRIEF DESCRIPTION OF THE DRAWINGS

The above and other objects and advantages of the present invention will become more apparent by describing the preferred embodiment thereof in more detail with reference to the accompanying drawings in which.

BEST MODE FOR CARRYING OUT THE INVENTION

Figure 1:
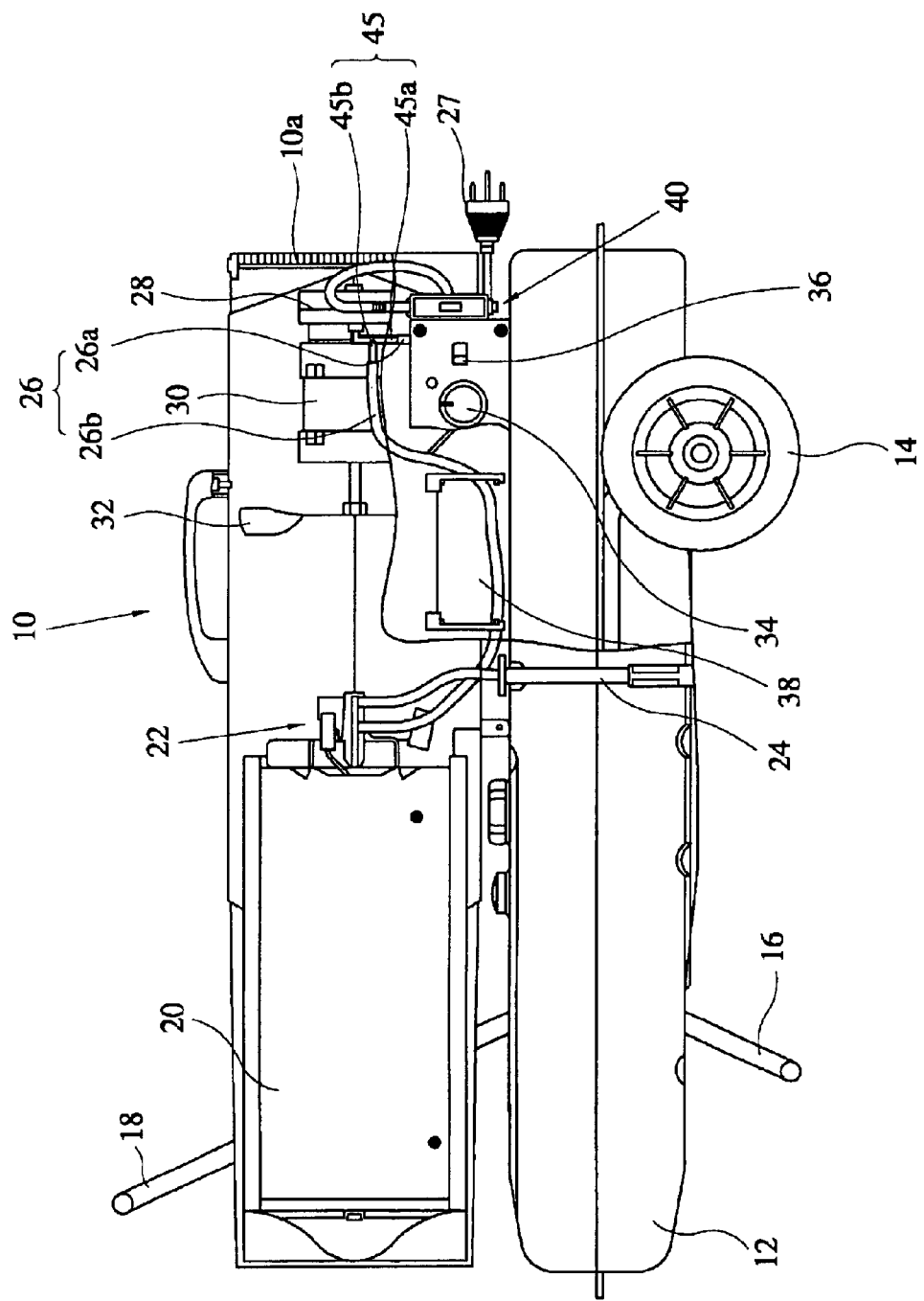
FIG. 1 is a partially exploded side view of a hot air generator according to the present invention.

A preferred embodiment of the present invention will be described with reference to the accompanying drawings.

The same or like elements are assigned with the same or like reference numerals.

Figure 2:
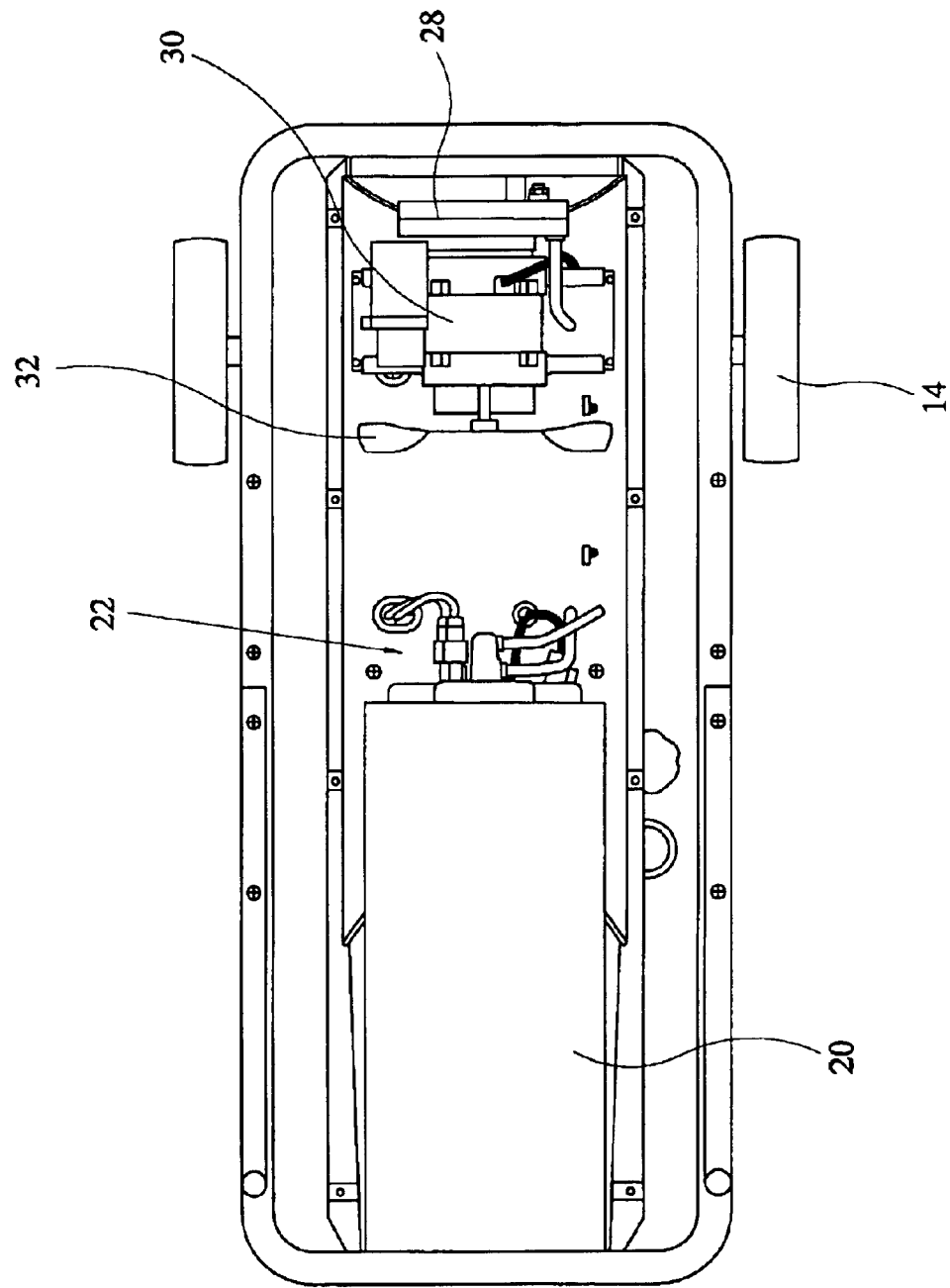
FIG. 2 is a plan view of the hot air generator shown in FIG. 1 according to the present invention.
Figure 3:
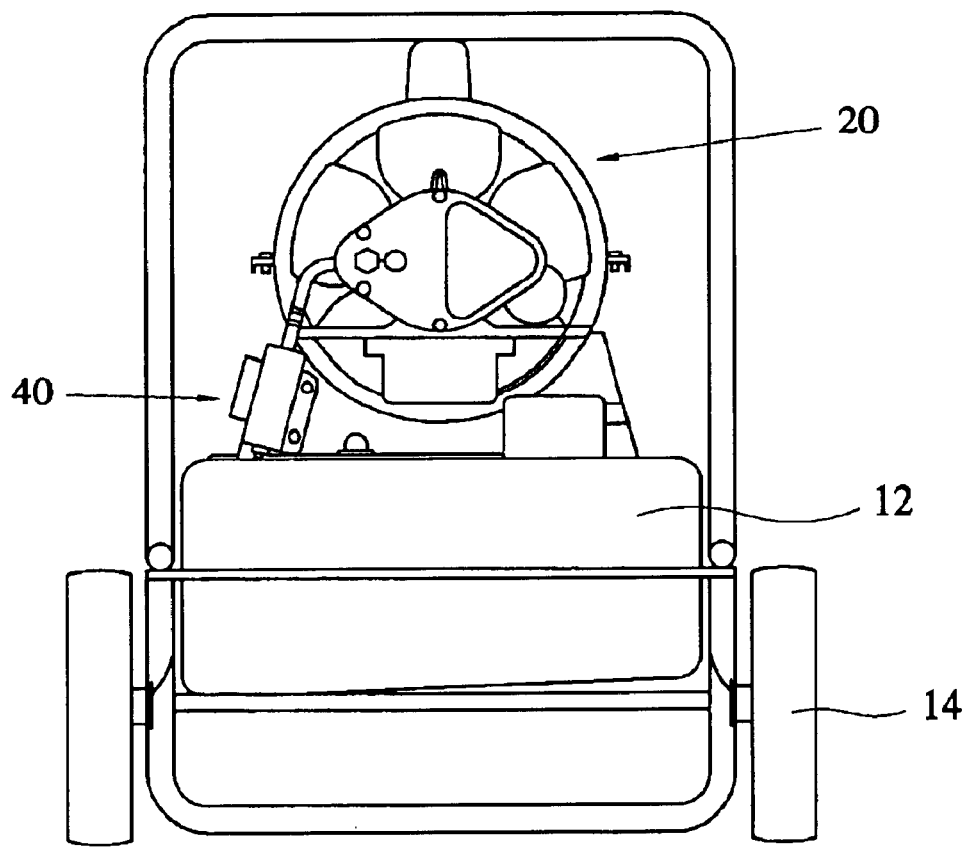
FIG. 3 is a rear view of the hot air generator shown in FIG. 1 according to the present invention.

Referring to FIGS. 1 through 3, a hot air generator according to the present invention includes a hot air generator body 10 provided with a fuel tank 12 in the lower portion thereof, a pair of wheels 14 provided in the lower end of the hot air generator body 10, to enable the hot air generator body to be rolled and moved, a stopper 16 provided adjacent the wheels 14, and a grip 18 provided in the upper portion of the hot air generator body 10.

The hot air generator according to the present invention includes the pair of wheels 14 and the grip 18 and thus can be easily moved.

Also, an air blower duct 20 provided with a heater (not shown) made of a heating coil is provided in the front area of the hot air generator body 10. A nozzle assembly 22 is installed in the rear end of the air blower duct 20.

A fuel line 24 supplied with fuel from a fuel tank 12 is connected to the nozzle assembly 22, together with a second air line 26b of a pressure measuring indicator 40 to be described later.

That is, the fuel supplied via the fuel line 24 of the fuel tank 12 and the air supplied via the air line 26 are mixed in the nozzle assembly 22, and burnt into combustion by the heater to thereby supply hot air.

A plurality of air inlets 10a which inhale air into the hot air generator body 10 is formed in the rear end of the hot air generator body 10.

A vane pump 28 generating a pressure by electric power applied from a power supply 27 and supplying fuel in the fuel tank 12 to the nozzle assembly 22 via the fuel line 24, is provided in the hot air generator body 10 adjacent the air inlets 10a.

A driving motor 30 driven in interlock with the vane pump 28 is mounted in the front side of the vane pump 28. An air blower fan 32 rotating by the driving motor 30 is provided between the nozzle assembly 22 and the driving motor 30.

The hot air can be discharged from the air blower duct 20 via the front side of the hot air generator body 10 by rotation of the air blower fan 32.

Meanwhile, a pressure measuring indicator 40 which measures a pressure generated from the vane pump 28 and visibly indicates the measured pressure is provided in the air line 26 which connects the vane pump 28 and the nozzle assembly 22 in the hot air generator according to the present invention.

Here, a T-shaped nozzle 45 which can transfer the pressure to both the nozzle assembly 22 and the pressure measuring indicator 40, is provided in the air line 26. The air line 26 is branched off by the T-shaped nozzle 45.

That is, the T-shaped nozzle 45 is formed of a first air nozzle 45a providing a pressure from the vane pump 28 to the pressure measuring indicator 40, and a second air nozzle 45b branched off from the first air nozzle 45a, providing the pressure input via the vane pump 28 to the nozzle assembly 22.

Hereinbelow, for convenience of explanation, an air line disposed between the vane pump 28 and the first air nozzle 45a is called a first air line 26a, and an air line disposed between the second air nozzle 45b and the nozzle assembly 22 is called a second air line 26b.

Also, a control knob 34 and an on/off switch 36 are installed in the periphery of the pressure measuring indicator 40. The control knob 34 is linked with a controller 38 made of a printed circuit board (PCB) which can control the whole operation of the hot air generator.

Figure 4:
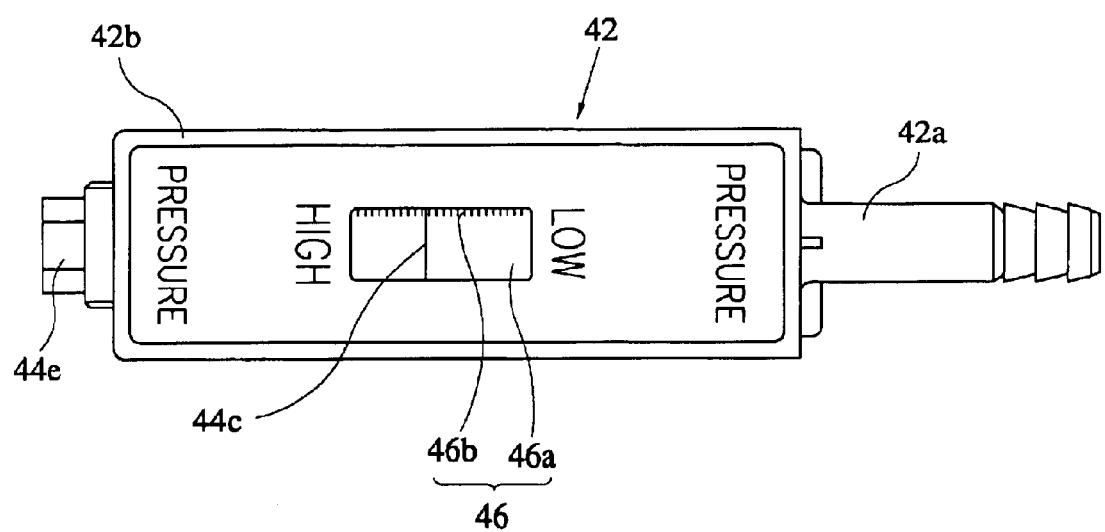
FIG. 4 is a view showing a pressure measuring indicator according to the present invention.
Figure 5:
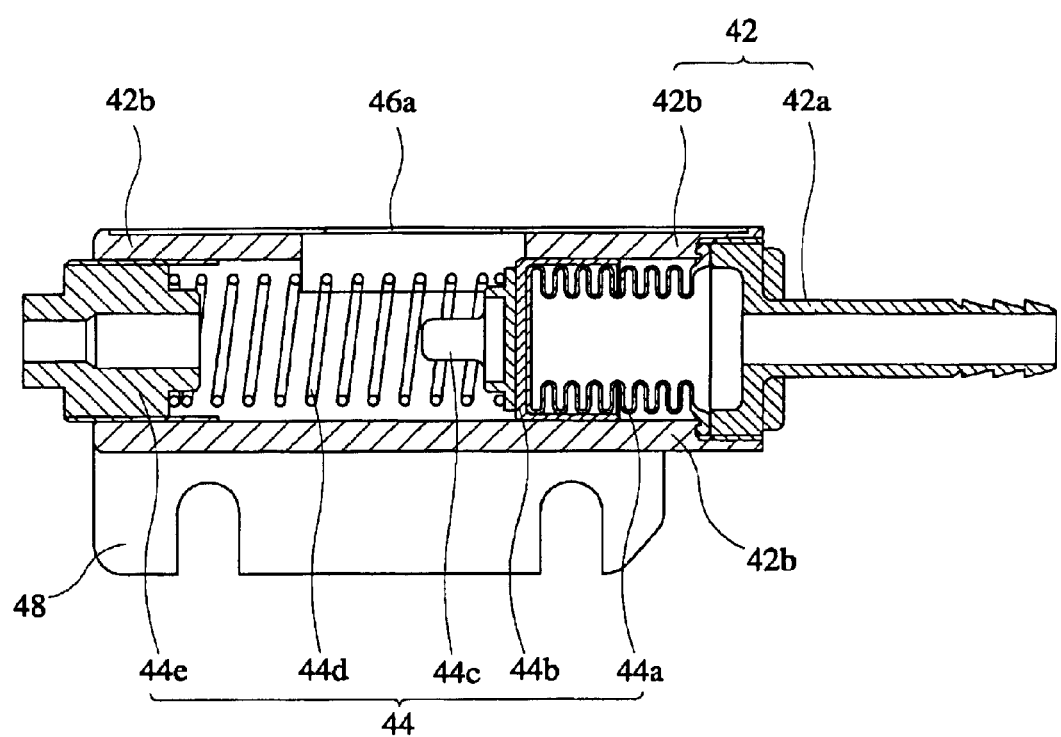
FIG. 5 is a view showing the internal components in the pressure measuring indicator shown in FIG. 4 according to the present invention.

Meanwhile, as shown in FIGS. 4 and 5, the pressure measuring indicator 40 according to the present invention includes an elongated measuring unit body 42, a pressure measuring unit 44 provided in the measuring unit body 42, and driven on the basis of a pressure inhaled into the measuring unit body 42 via the first air nozzle 45a and the first air line 26a, and a pressure indicator 46 having a pressure indicator window 46a provided with pressure readings 46b so that a user can recognize a pressure visibly according to operation of the pressure measuring unit 44.

Here, the measuring unit body 42 includes a cover 42a fitted into the first air line 26a, and a cylinder 42b having the pressure indicator window 46a in the pressure indicator 46, which are mutually connected with each other to embody a single body.

Also, the measuring unit body 42 is assembled with one side of the hot air generator body 10 by a fixing bracket 48 integrally provided on the outer circumference so as to be easily detached and attached from and to the hot air generator body 10, respectively.

As described above, since the pressure indicator window 46a in the pressure indicator 46 is provided on the outer circumference of the cylinder 42b forming the measuring unit body 42, and the pressure indicator window 46a is installed in the outer side of the hot air generator 10, the user can recognize a pressure indicated on the pressure measuring indicator, to thus accomplish the aim of the present invention.

Here, the pressure readings 46b indicated on the pressure indicator window 46a are realized in analog form.

Also, the pressure measuring unit 44 is installed in the internal space formed between the cover 42a and the cylinder 42b forming the measuring unit body 42.

Here, the pressure measuring unit 44 includes an air chamber 44a provided in the cylinder 42b with one end thereof combined at a sealing state with one inner side of the cylinder 42b by the cover 42a, an air chamber guide 44b installed in the front surface of the air chamber 44a, and moving at the time of expansion of the air chamber 44a and also surrounding and supporting one end of the air chamber 44a, a spring member 44d provided in the outer side of the air chamber guide 44b and contracted and elastically restored according to a pressure applied to the air chamber 44a, an indicator 44c combined on the outer side of the air chamber guide 44b, and moving between the air chamber guide 44b and the spring member 44d to thereby indicate a pressure, and a tension adjustment screw 44e installed in one side end of the cylinder 42b which is opposite to the cover 42a, for adjusting a tension of the spring member 44d.

The air chamber 44a is formed of a bellows which is expanded along the lengthy direction of the cylinder 42b based on a pressure input into the cylinder 42b via the first air line 26a.

The air chamber 44a having the form of a bellows is made of rubber or silicon which can be expanded by an input air pressure in the form of a corrugated pocket. It is most preferable to use rubber which would not be torn even by a strong pressure.

The indicator 44c is provided on the front surface of the air chamber guide 44b, and protrudes from the front surface thereof. The reason why the indicator 44c protrudes is to support the spring member 44d, so that the spring member 44d does not secede from the assembly position.

Also, the indicator 44c indicates a pressure reading 46b on the pressure indicator window 46a formed on the outer circumferential surface of the cylinder 42b.

As described above, the indicator 44c is preferably coated in red color on the upper surface of the indicator 44c, in order to allow users to accurately recognize a pressure reading in a single line via the pressure indicator window 46a since the indicator 44c itself must play a role of indicating the pressure readings 46b.

Hereinbelow, the operation of the hot air generator provided with the pressure measuring indicator 40 having the above-described structure will be described together with the operation of measuring and indicating the pressure in the pressure measuring indicator 40.

First, a power on/off switch 36 is manipulated in order to operate the hot air generator. When power is applied thereto, the air blower fan 32 is rotated, and thus air is inhaled via air inlets 10a formed on the rear surface of the hot air generator body 10, and simultaneously a pressure is generated from the vane pump 28 interlocked with the driving motor 30.

The pressure generated from the vane pump 28 is transferred to the nozzle assembly 22 and the pressure measuring indicator 40 via the air line 26, respectively. Here, the pressure is applied to the nozzle assembly 22 and the pressure measuring indicator 40 via the T-shaped nozzle 45 formed along the air line 26, with an identical force.

That is, although the air line 26 is branched off into the first air line 26a and the second air line 26b, to then be connected to the nozzle assembly 22 and the pressure measuring indicator 40, respectively, both the first and second air lines 26a and 26b continue through a single air line. As a result, it is natural that a magnitude of the pressure transferred to the nozzle assembly 22 and the pressure measuring indicator 40 be identical.

Thus, since the pressure measured by the pressure measuring indicator 40 can be identified with the pressure applied to the hot air generator by operation of the vane pump 28, users can accurately recognize a running pressure applied to the nozzle assembly during burning, through the pressure measured by the pressure measuring indicator 40.

The operation of measuring the pressure in the pressure measuring indicator 40 will be described below.

When a pressure is input into the cylinder 42b in the measuring unit body 42, the air chamber 44a is expanded by the force of the input pressure, and thus makes the air chamber guide 44b move.

Accordingly, the spring member 44d contacting the outer side of the air chamber guide 44b is contracted and simultaneously the indicator 44c combined with the air chamber guide 44b is moved. Thus, the indicator 44c indicates a pressure reading 46b formed on the pressure indicator window 46a.

As a result, users can immediately recognize a pressure applied to the hot air generator by reading a pressure reading 46b indicated by the indicator 44c on the pressure indicator window 46a.

Meanwhile, as described above, the pressure input via the air line 26 is input into the first air nozzle 45a and the first air line 26a, and branched off in the T-shaped nozzle 45 to then be input into the nozzle assembly 22 via the second air nozzle 45b and the second air line 26b. In this case, the pressure identical to the pressure indicated on the pressure measuring indicator 40 is generated in the nozzle assembly 22.

As the pressure is generated in the nozzle assembly 22, the fuel is fed to the nozzle assembly 22 via the fuel line 24 from the fuel tank 12 due to the pressure. The fed fuel is discharged via the nozzle assembly 22 and mixed with the air inhaled into the nozzle assembly 22, to then be heated by a heater (not shown).

The hot air obtained by being heated by the heater is air-blown by the air blower fan 32, and then discharged via the front surface of the hot air generator body 10, so as to be used at a place such as a factory or a closed area where hot air is needed, or is used to remove humidity at a greenhouse called a vinylhouse using a greenhouse effect or a cattle shed.

As described above, in the hot air generator according to the present invention, the air line 26 connecting the vane pump 28 and the nozzle assembly 22 is branched off into two lines and provided with the pressure measuring indicator 40 which can measure a pressure at one line thereof, to thereby enable users to immediately recognize the pressure generated during running of the hot air generator.

Thus, in the case that the operation of the driving motor 30 interlocking with the vane pump 28 fails, users can immediately recognize how many pressures are generated, and thus countermeasure thereto immediately.

As described above, the hot air generator according to the present invention is provided with a pressure measuring indicator having a pressure indicator window exposed on the outer side of the hot air generator body and indicating the pressure readings, in which the air line is branched off into two lines and the pressure measuring indicator is installed at one line thereof to measure the pressure generated from the vane pump. Thus, the present invention provides an effect of allowing users to immediately recognize the pressure generated during running visibly.

As a result, the present invention can easily control the pressure generated from the vane pump which is driven in interlock with the driving motor, and easily check an ignition-failure cause to thereby curtail an after-service time. Also, the present invention can save a production cost in comparison with the case that a pressure gauge is mounted in the conventional art.

In particular, the present invention cannot only solve the burden of the conventional art using a pressure gauge as necessary, in order to check the current pressure, and but also enables users to immediately recognize whether or not a running pressure is appropriate.

The present invention is not limited in the above-described embodiments It is apparent to one who is skilled in the art that there are many variations and modifications without departing off the spirit of the present invention and the scope of the appended claims.

What is claimed is:

1. A pressure measuring structure of a hot air generator comprising:

a hot air generator body provided with a fuel tank in the lower portion thereof;

an air blower duct having a heater therein and provided in the upper portion of the hot air generator body;

a nozzle assembly provided in the rear portion of the air blower duct;

a vane pump provided in the rear end of the hot air generator body, connected to the nozzle assembly through an air line, and generating a predetermined pressure;

an air blower fan for blowing air toward the air blower duct; and a driving motor driven in interlock with the vane pump and rotating the air blower fan, wherein the air line connecting the vane pump with the nozzle assembly is branched off into a first air line and a second air line via a T-shaped nozzle, wherein the second air line is connected to the nozzle assembly, and wherein a pressure measuring indicator for measuring a pressure generated from the vane pump is installed along the first air line.

2. The pressure measuring structure of a hot air generator of claim 1, wherein the pressure measuring indicator comprises:

a measuring unit body having a cover fitted into the first air line, and a cylinder mutually connected with the cover to embody a single body;

a pressure measuring unit provided in the measuring unit body, and driven on the basis of a pressure inhaled into the measuring unit body via the first air line; and a pressure indicator having a pressure indicator window provided with pressure readings formed on the outer circumferential surface of the cylinder so that a user can recognize a pressure visibly according to operation of the pressure measuring unit.

3. The pressure measuring structure of a hot air generator of claim 2, wherein the pressure measuring unit comprises:

an air chamber provided in the cylinder with one end thereof combined at a sealing state with one inner side of the cylinder by the cover so that the air chamber is expanded along the lengthy direction of the cylinder based on a pressure input into the cylinder via the first air line;

an air chamber guide installed in the front surface of the air chamber, and moving at the time of expansion of the air chamber and also surrounding and supporting one end of the air chamber;

a spring member provided in the outer side of the air chamber guide and contracted and elastically restored according to a pressure applied to the air chamber;

an indicator combined on the outer side of the air chamber guide, and moving between the air chamber guide and the spring member to indicate a pressure reading on the pressure indicator window to indicate a pressure in the air chamber; and a tension adjustment screw installed in one side end of the cylinder which is opposite to the cover, for adjusting a tension of the spring member.

4. The pressure measuring structure of a hot air generator of claim 3, wherein the air chamber is preferably formed of a corrugated structure in the form of a bellows, so that the air chamber can be expanded according to a pressure of the air incoming via the cover.

5. The pressure measuring structure of a hot air generator of claim 4, wherein the air chamber is made of rubber or silicon.

* * * * *